Patented Oct. 16, 1951

2,571,240

UNITED STATES PATENT OFFICE 2,571,240

PLASTICIZED AMINO RESINOUS COMPOSITIONS AND THEIR PREPARATION

John Edward Howard Hayward and Philip Hugh Calderbank, Birmingham, England, assignors, by mesne assignments, to Union Carbide and Carbon Corporation, a corporation of New York No Drawing. Application April 23, 1947, Serial No. 743,454. In Great Britain May 1, 1946

12 Claims. (Cl. 260—31.4)

This invention is for improvements in or relating to plasticized resinous compositions and has particular reference to plasticized amino resins.

In the manufacture of molding, coating and other resinous compositions having a basis of amino resins, it is frequently desirable to incorporate a plasticizer. Such an addition is desirable for several reasons. Thus, in the manufacture of a moldable composition the addition of a plasticizer permits a longer mixing time for incorporating filler and resin, and hence the formation of more uniform products. Further, the plasticizer gives increased flowability on molding and thus facilitates the formation of intricate moldings. In coating compositions, a plasticizer imparts greater flexibility and toughness to the film.

Unfortunately, the addition of known plasticizers tends to impair the hardening rate and thus in commercial amino resin compositions it is essential to restrict the addition of plasticizer to amounts that do not increase the hardening time unduly. A further disadvantage of the use of known plasticizers is the sacrifice in chemical resistance which is particularly marked with those plasticizers which in general are most readily compatible with amino resins.

It is an object of the present invention to prepare plasticized amino resin compositions which possess the advantages of a plasticized composition outlined above without unduly sacrificing hardening characteristics. A further object is to provide a plasticizer which is easily compatible with the amino resin to form a composition in which the chemical resistance of the amino resin is substantially unimpaired. These objects are attained by incorporating in the resinous composition a reagent which functions as an easily compatible plasticizer in the manufacturing and shaping operations, and which on raising the temperature functions as an accelerator of hardening. A substance having this latter property is hereinafter described as functioning as a latent accelerator of hardening. Such an accelerator exercises little or no hardening action at room temperature or at moderately raised temperatures but at higher temperatures, e. g. above 80° C., become increasingly effective.

According to the present invention there is provided a process for the production of an amino resin composition which includes the step of incorporating in an amino resin a substance which functions both as a plasticizer and as a latent accelerator of hardening, the substance being a derivative of a polyhydric alcohol, such as tri- and tetra-polyhydric alcohols, in which one or more of the hydroxyl groups have been esterified, one or more blocked by interaction with a phenol or an alcohol, and in which one or more hydroxyl groups remain free.

Examples of such plasticizers are the monochlorhydrin of monocresyl glyceryl ether, the monochlorhydrin of monoisopropyl glyceryl ether, monocresyl-glyceryl butyl oxalate, and monobenzyl-pentaerythritol monochlorhydrin.

The amino resin may consist of the condensation product of formaldehyde or other aldehyde with a urea, thiourea, or an aminotriazine, or with mixtures of these materials.

The plasticizers may be used in conjunction with the usual acid hardeners, the combined use of the two leading to very rapid hardening without sacrifice of plasticity.

The following are descriptions by way of example of methods of carrying the invention into effect:

Example 1

The following mixture was prepared, the reagents being added in the order listed:

| | Pounds |
|---|---|
| Aqueous formaldehyde (37.5% by weight $CH_2O$) having an acid value of about 50 mgm. KOH per 100 mls | 40.0 |
| Ammonia (0.910 specific gravity) | 2.49 |
| Urea | 21.0 |

The reaction mixture was heated under such conditions that the temperature rose to 80° C. in 20 minutes and was then cooled. The pH value of the cooled liquid was about 8.5. Monocresyl glyceryl monochlorhydrin, 0.5 pound, was then stirred into the resin solution. The mixture was dehydrated under a vacuum of 25" of mercury, the temperature being kept below 60° C. During the dehydration step about half the total quantity of water present was removed and a yield of 48 pounds of concentrated syrup (an aqueous solution of the resin) was obtained.

The concentrated syrup was mixed with 16 pounds of wood flour and with other usual additions, e. g. coloring materials and lubricants. The mass was dried in a vacuum drier at a temperature of about 70° C. under a vacuum of 26" mercury, and the dried mass was treated on heated mixing rolls and after cooling was ground to give the finished moldable composition. It had excellent plasticity during molding but nevertheless was very fast curing so that moldings of excellent mechanical properties and water resistance were produced in short-time cycles, e. g. of 1 minute at 150° C.

Example 2

| | | |
|---|---|---|
| Aqueous formaldehyde (37.5% by weight $CH_2O$) | lbs | 40.0 |
| Triethanolamine | oz | 6.5 |
| Ammonia (0.880 specific gravity) | lbs | 1.31 |
| Urea | lbs | 21.0 |

The reaction mixture was heated up to 70° C. in 30 minutes and cooled to room temperature. The pH value of the cooled resin solution was found to be 8.2 to 8.3 and was reduced to 7.2 to 7.3 by the addition of about 725 cc. of NHCl.

One pound of monocresyl glyceryl monochlohydrin was stirred into the resin solution and fillers, lubricants, pigments and so forth were incorporated.

After drying in a vacuum drier, milling on hot rolls and grinding, the resultant moldable composition was found to possess excellent plasticity combined with very rapid molding properties.

Example 3

| | Pounds |
|---|---|
| Aqueous formaldehyde (37.5% by weight $CH_2O$ neutralized with NaOH to a pH of 7.5 to 8 | 40 |
| Urea | 14 |

The reaction mixture was heated to 80° C. in 30 minutes and cooled to room temperature. Monocresyl glyceryl chlorhydrin, 5 pounds was added and the mixture refluxed gently for 60 minutes. The product was neutralized with NaOH to a pH value of 7.5 to 8 and dehydrated under a vacuum of 25" of mercury to form a viscous resin which can be used as an adhesive.

Example 4

| | Pounds |
|---|---|
| Aqueous formaldehyde (37.5% by weight $CH_2O$) | 48.0 |
| Aqueous sodium hydroxide (40%) | 0.5 |
| Melamine | 50.0 |

The mixture was stirred, heated to the boiling point in 30 minutes, refluxed for a further 10 minutes and cooled. The product was well mixed with

| | Pounds |
|---|---|
| Monobenzyl-pentaerythritol monochlorhydrin | 1.5 |
| Woodflour | 12.5 |
| Zinc stearate | 0.5 |

The mixture was spread on trays and dried in a vacuum oven or forced draught oven at about 140°-180° F. The dried product was then hot rolled, ground and blended, forming a fast setting molding material possessing excellent water resistance.

Example 5

One hundred pounds of an aqueous urea-formaldehyde resin solution of approximately 73 per cent resin content were intimately mixed with pigments, dyestuffs, and ground paper pulp. Five pounds of the monochlorhydrin of monocresyl glyceryl ether were added and thoroughly mixed. Paper was impregnated with the resulting varnish and the impregnated paper was dried and cut into pieces which were superposed and molded under heat and pressure to form a laminated sheet. The dried paper possessed excellent flowing and curing properties, whilst the finished laminated sheet had a good surface gloss and resistance to moisture.

The resinous compositions of the invention may be used for many other purposes. They may be used, for instance, as binders in laminated products. Thus, paper or textile fabric may be impregnated with a solution of the resinous composition and the impregnated sheets superposed and rapidly molded to form laminated products characterized by efficient bonding, good surface gloss and excellent chemical resistance. They may also be dissolved in volatile organic solvents to form coating compositions which are characterized by good adhesion and fast hardening characteristics.

What is claimed is:

1. A process for the production of an amino resin composition which includes the step of incorporating in an amino resin condensation product of formaldehyde and a member of the group consisting of urea, thiourea and amino triazines a substance which functions both as a plasticizer and as a latent accelerator of hardening, the substance being a derivative of a single molecule of a polyhydric alcohol selected from the group consisting of glycerol and pentaerythritol in which molecule one of the hydroxyl groups is esterified, one is blocked by interaction with one of the group consisting of phenols and alcohols free of reactive groups other than hydroxyl, and at least one hydroxyl group remains free.

2. A process as claimed in claim 1 wherein the substance which functions both as a plasticizer and as a latent accelerator of hardening is the monochlorhydrin of monocresyl glyceryl ether.

3. A process as claimed in claim 1 wherein the substance which functions both as a plasticizer and as a latent accelerator of hardening is the monochlorhydrin of monoisopropyl glyceryl ether.

4. A process as claimed in claim 1 wherein the substance which functions both as a plasticizer and as a latent accelerator of hardening is monocresyl-glyceryl butyl oxalate.

5. A process as claimed in claim 1 wherein the substance which functions both as a plasticizer and as a latent accelerator of hardening is monobenzyl-pentaerythritol monochlorhydrin.

6. A process as claimed in claim 1 wherein the plasticizer is employed in conjunction with an acid.

7. Composition comprising an amino resin condensation product of formaldehyde and a member of the group consisting of urea, thiourea and amino triazines having incorporated therein a derivative of a single molecule of a polyhydric alcohol selected from the group consisting of glycerol and pentaerythritol in which molecule one of the hydroxyl groups is esterified, one is blocked by interaction with one of the group consisting of phenols and alcohols free of reactive groups other than hydroxyl, and at least one hydroxyl group remains free, said derivative being a latent accelerator for hardening the amino resin.

8. Composition according to claim 7 in which the derivative is the monochlorhydrin of monocresyl glyceryl ether.

9. Composition according to claim 7 in which the derivative is the monochlorhydrin of monoisopropyl glyceryl ether.

10. Composition according to claim 7 in which the derivative is the monocresyl-glyceryl butyl oxalate.

11. Composition according to claim 7 in which the derivative is the monobenzyl-pentaerythritol monochlorhydrin.

12. Composition comprising an amino resin from the group consisting of the condensation product of an aldehyde with one of the group consisting of urea, thiourea, and an amino triazine, having incorporated therein a derivative of a single molecule of a polyhydric alcohol selected from the group consisting of glycerol and pentaerythritol in which molecule one of the hydroxyl groups is esterified, one is blocked by interaction with one of the group consisting of phenols and alcohols free of reactive groups other than hydroxyl, and at least one hydroxyl group remains free, said derivative being a latent accelerator for hardening the amino resin.

JOHN EDWARD HOWARD HAYWARD.
PHILIP HUGH CALDERBANK.

REFERENCES CITED

The following references are of record in the file of this patent:

UNITED STATES PATENTS

| Number | Name | Date |
|---|---|---|
| 2,173,181 | Robinson | Sept. 19, 1939 |
| 2,381,247 | Barth et al. | Aug. 7, 1945 |
| 2,393,513 | Bent et al. | Jan. 22, 1946 |
| 2,460,187 | Moffett | Jan. 25, 1949 |

OTHER REFERENCES

Chemistry of Synthetic Resins, Ellis, 1935, vol. 1, pages 617–619.

Marle: Journal Chem. Society, vol. 101, 1912, page 312.

Chemistry of Synthetic Resins, Ellis, 1935, vol. 1 page 356.

Certificate of Correction

Patent No. 2,571,240 October 16, 1951

JOHN EDWARD HOWARD HAYWARD ET AL.

It is hereby certified that error appears in the printed specification of the above numbered patent requiring correction as follows:

Column 5, line 8, for "molecule" read *derivative*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*